E. Foster.
Life Preserving Berth.
N° 18,090.    Patented Sep. 1, 1857.
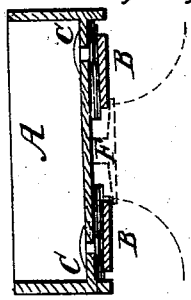
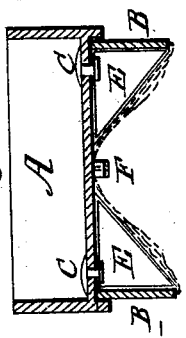
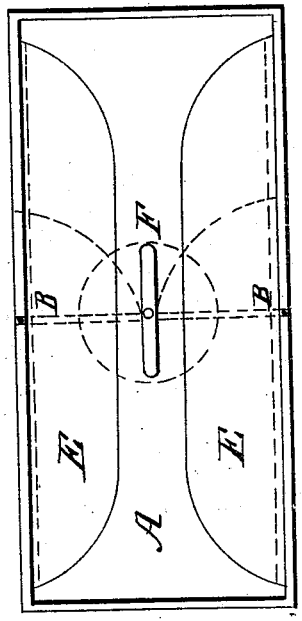
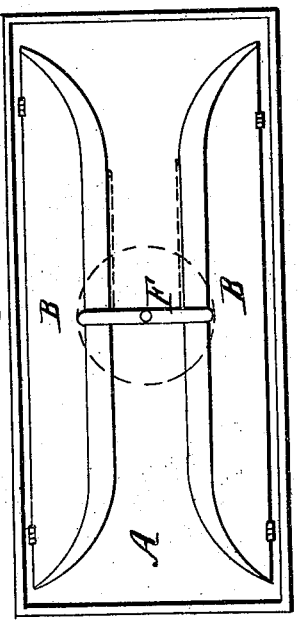
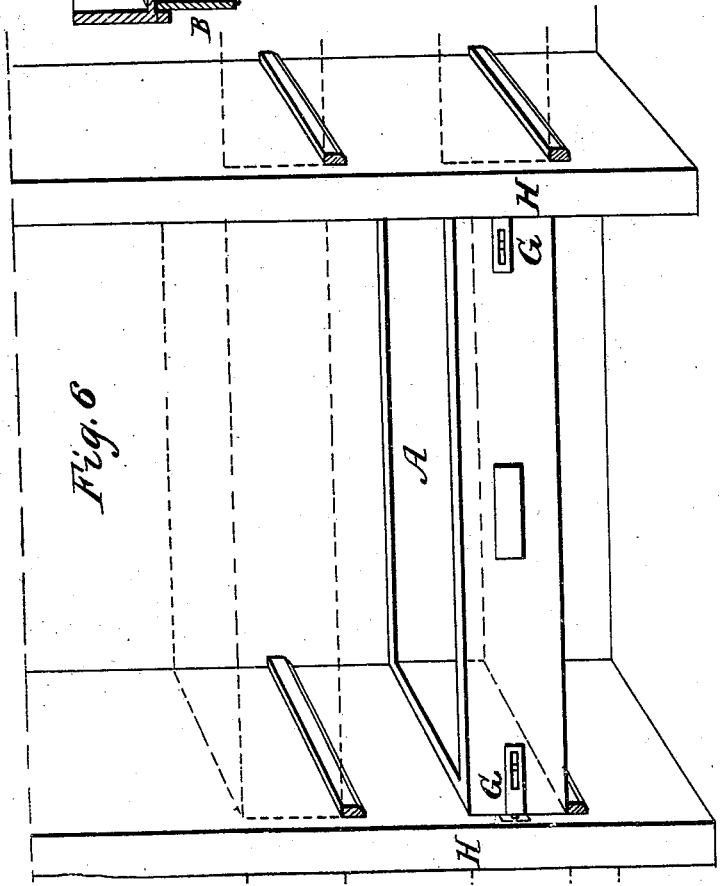
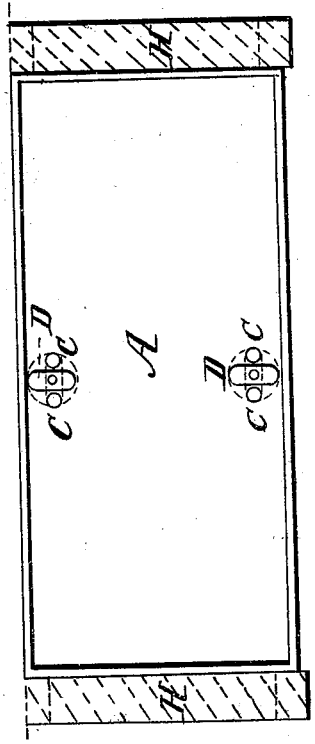

UNITED STATES PATENT OFFICE.

ELBRIDGE FOSTER, OF HARTFORD, CONNECTICUT.

LIFE-PRESERVING BERTH FOR STEAM AND OTHER VESSELS.

Specification of Letters Patent No. 18,090, dated September 1, 1857.

*To all whom it may concern:*

Be it known that I, ELBRIDGE FOSTER, of the city of Hartford, county of Hartford, and State of Connecticut, have invented a new and useful Improvement in the Mode of Constructing Life-Preserver Berths for the Use of Steam and other Vessels; and I do hereby declare that the following is a correct description thereof, reference being had to the accompanying drawing and to the letters of reference marked thereon.

The nature of my invention consists in the construction of movable and adjustable berths, with inflated elastic keels to be used as a life-preserver on steam and other vessels.

To enable others skilled in the art to make and use my invention I will proceed to describe its construction and operation.

*The drawing.*—Figure 1 is a plan of the berth showing valve openings. Fig. 2 is a plan of bottom when open. Fig. 3 is ditto when closed. Fig. 4 is end view open. Fig. 5 is ditto closed. Fig. 6 is view of partitions, fillets, front, &c.

I construct a frame or box of light wood A about the usual size of a common berth such as are generally used in steam boats. I make it water tight as described Fig. 1. On each side of the underpart I make and attach with hinges a properly shaped board B, to form a kind of keel. Hinged so as to fall or fold down to the bottom of the berth (see Fig. 5,) when not required to be used as a life preserver. I then take a suitable kind of water proof elastic cloth, rubber or other proper substance and fasten it in the manner shown in the end view Fig. 4, forming when expanded an angular shaped bag or cavity E the whole length of the keel or nearly so.

When the keels B, are brought out at right angles with the bottom, the angular shaped cavity E is formed, and the air is admitted in through the valve openings, C, in the bottom Fig. 1, and when properly inflated with air the rotary stop D is turned over the holes or valve openings C to prevent any admission of water to the keel cavity E through said openings. This bag or cavity being filled with air the sides B cannot be pressed inward by the water, neither can the bags collapse, while the valves C are closed, and the air does not escape but as an extra precaution I can attach a cross bar, spring or other device to prevent the sides falling inward when inflated.

When the berth is used in common as a bed, the valves are opened for the escape of the air, which permits the sides to fold down flat on the bottom as Figs. 3 and 5, and are secured by the button F or any other proper device and being now flush with the lower edge of the front offer no impediment or obstruction to the berth below.

The berth is made to slide into the usual recess between the upright partitions H on fillets fastened to the sides, and when in are retained by bolts G or some other suitable manner so that it can be conveniently and easily taken out by any one when required.

The utility of this article is that a steam boat or other vessel can be fitted up with them in the place of the present permanently fixed berths, without any alteration of the general arrangement, and with a small advance of cost, retaining all the present outward appearance.

Each person when using this berth will feel confident that he is sleeping upon that which will perhaps in case of accident be the means of his safety.

Each one of these berths when inflated will bear up 1, 2 or 3 persons in the water, so that 100 will be sufficient for a whole ship's crew and passengers, and have a chance for safety for all, by attaching a rope to them when in the water, they will form a flotilla superior to any raft that could be constructed and better than all the boats, of which there is often a scarcity.

The form of the berth is such that it will not easily upset, and should that be the case they would be equally buoyant.

Loops and handles can be attached to hold by when in the water.

Many lives would have been saved by having this article on board, when the late unfortunate accidents happened.

What I claim as my invention and desire to secure by Letters Patent is—

The adjustable inflated keels, in the manner as herein described, and for the purpose set forth.

ELBRIDGE FOSTER.

Witnesses:
WM. VINE,
EDWARD GOODMAN.